Aug. 3, 1965
H. E. HYSLOP
3,198,336
PLEATED OIL FILTER
Filed March 2, 1961
2 Sheets-Sheet 1
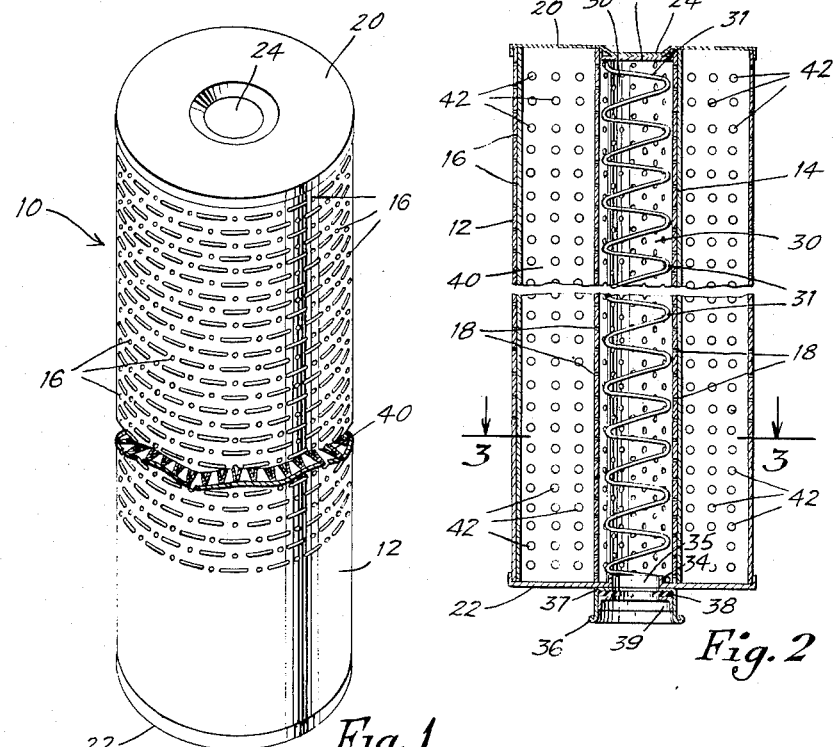
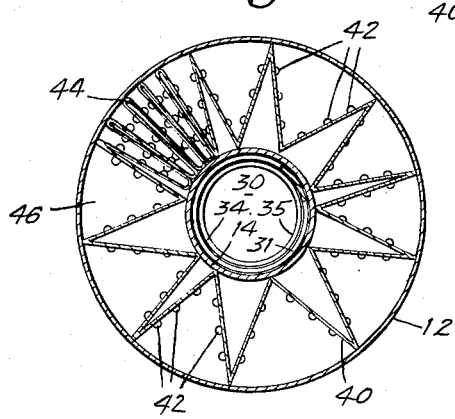
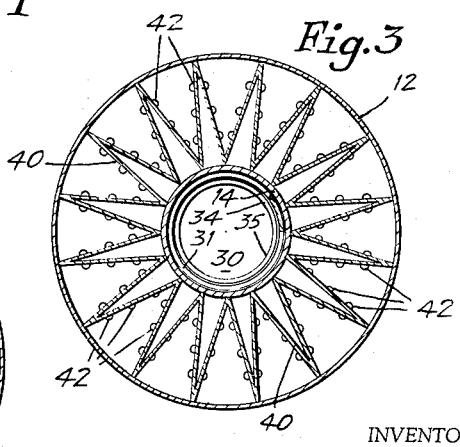
INVENTOR
Harry Hyslop,
BY Diggins + LeBlanc
ATTORNEYS Aug. 3, 1965   H. E. HYSLOP   3,198,336
PLEATED OIL FILTER
Filed March 2, 1961   2 Sheets-Sheet 2
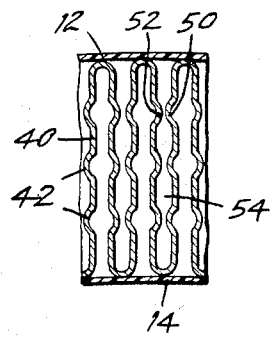
*Fig. 5*
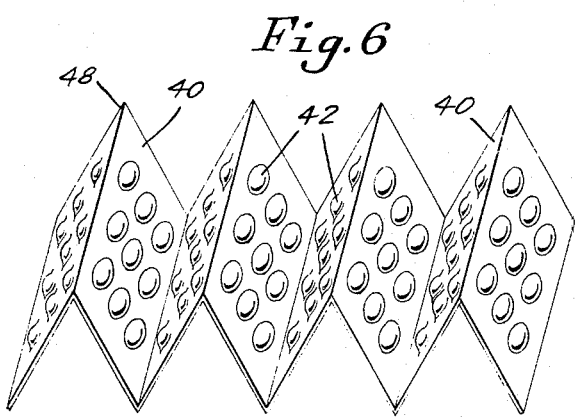
*Fig. 6*
*Fig. 7*
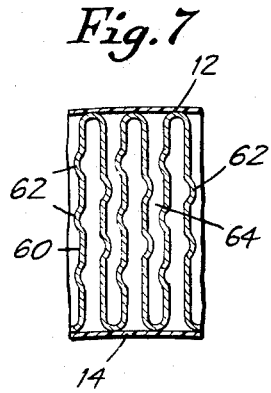
*Fig. 8*
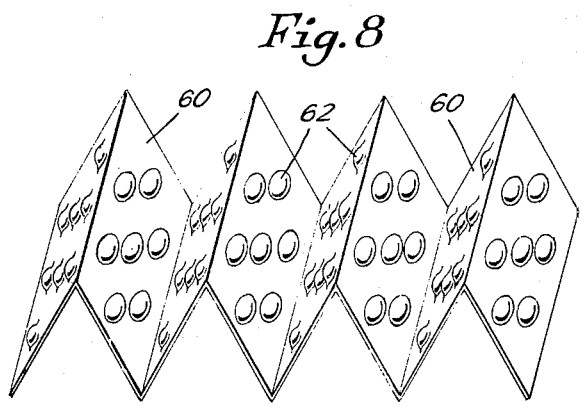
INVENTOR
Harry Hyslop,
BY Diggins + LeBlanc
ATTORNEYS

United States Patent Office 3,198,336
Patented Aug. 3, 1965

3,198,336
PLEATED OIL FILTER
Harry E. Hyslop, 200 S. Michigan Ave., Chicago, Ill.
Filed Mar. 2, 1961, Ser. No. 92,917
3 Claims. (Cl. 210—457)

This invention relates to liquid filtering devices and more particularly to a novel oil filter particularly suited for use in filtering the lubricating oil of diesel railroad engines.

Difficulties have been encountered in the use of multi-phased type paper filters involving the tendency of the pleats to pack up or become pressed together in localized areas of the filter. Pressure gradients throughout the volume of the pleated paper area create pressure differentials tending to further increase the localized compacting of the adjacent filter pleats. As a result, substantial areas of the filter are completely bypassed, thus substantially reducing the efficiency of the filter and making it incapable of handling large quantities of lubricating oil.

It has been proposed, in order to overcome the localized packing tendency of the paper pleats, to coat the surface of the cylindrical filter wall with an adhesive material to which the outer folded edges of the pleats adhere so that they are not dislodged by the pressure gradients and so that adjacent pleats cannot be pressed together. Modifications of this technique include limiting the adhesive to spaced bands around the inner periphery of the filter cylinder so that the outer edges of the pleat folds are fixed at only spaced points along the length of the filter. All of these proposals, however, require an additional fabrication step involving the application of adhesive to various locations of the filter and tend to substantially increase both the cost of labor and materials involved in the production of a finished filter item. In addition, the adhesive on the outer shell does not hold the cotton linters of the phased paper in the proper position as well as it does smooth surface filter paper.

The present invention avoids the above-mentioned difficulty of pleat crowding without the necessity for the application of adhesive to the pleats by forming the pleat material with a plurality of projections or dimples which, when the filter paper is in pleated position in the filter, abut adjacent pleats so as to keep the filter pleats properly spaced. In addition to stabilizing the pleats, the formation of dimples in the filter paper also acts to increase the potential contaminant load area of the filter.

It is therefore a primary object of the present invention to provide an improved fluid medium filtering device.

Another object of the present invention is to provide an improved diesel lubricating oil filter.

Another object of the present invention is to provide a pleated oil filter incorporating spaced protuberances, or dimples, to prevent localized filter paper crowding.

These and further objects and advantages of the invention will be more apparent upon reference to the following specification, claims and appended drawings wherein:

FIGURE 1 is a perspective view of an oil filter constructed in accordance with the present invention;

FIGURE 2 is a vertical cross-section through the filter of FIGURE 1;

FIGURE 3 is a cross-section taken along line 3—3 of FIGURE 2;

FIGURE 4 is a cross-section similar to FIGURE 3 showing the crowding action of the filter paper folds under the influence of localized pressure gradients;

FIGURE 5 is an enlarged cross-section through a portion of the filter of FIGURES 1–3 showing a uniform series of dimples formed in the filter paper pleats;

FIGURE 6 is a perspective view of the filter paper prior to its insertion into the filter;

FIGURE 7 is an enlarged view of a modified embodiment similar to FIGURE 5 but incorporating randomly spaced dimples; and FIGURE 8 is a perspective view of the filter paper of the embodiment of FIGURE 7 prior to insertion into the filter.

Referring to the drawings, the novel oil filter of the present invention generally indicated at 10 in FIGURE 1 comprises outer and inner concentric cylindrical walls 12 and 14 formed of any suitable rigid material such as synthetic plastic, fiberboard, pressed paper or the like, and preferably the outer wall 14 is made of a strong and durable high density paper while inner wall 12 is made of No. 28 gauge cold rolled steel. The material comprising walls 12 and 14 is preferably lightweight and relatively thin while, at the same time, having sufficient rigidity and strength to assure that the filter will not be distorted during use. Outer and inner walls 12 and 14 are provided with a plurality of filter apertures 16 and 18 through which the oil or other liquid to be filtered passes, with the apertures in outer wall 12 arranged in a dot-dash pattern as shown.

The opposite ends of the cylinders 12 and 14 are closed off by metal end caps 20 and 22 secured by adhesive or other suitable means to the respective cylinders. End caps 20 and 22 may be formed of any suitable rigid material and may be made of the same or different material than that of the cylinders 12 and 14. Preferably the end caps are made of No. 26 gauge tin plate and impervious to the flow of fluid. End cap 20 is provided with a central depression 24 abutting a No. 24 gauge steel pressure plate 32 closing off the upper end of inner cylinder 14.

Lower end cap 22 is provided with an upturned flange 34 defining a lubricant inlet passage 35. A retainer shell 36 of No. 24 gauge tin plate is provided with an inwardly turned flange 37 secured to the underside of end cap 22. An annular neoprene gasket 38 is retained between flange 37 and a No. 24 gauge steel retainer ring 39 suitably secured to the inner surface of retainer shell 36.

A helical No. 12 gauge steel reinforcing spring 31 extends from pressure plate 32 at the upper end of cylinder 14 to the lower end cap 22 with its lower end surrounding end cap flange 34. The coil spring 31 increases the crushing strength of inner cylinder 14, eliminating the possibility of its collapse under pressure.

Filling the annular space between the inner and outer cylindrical walls 12 and 14 are the integral layers of a folded or corrugated paper filter 40. The filter paper, in addition to being corrugated, is provided over its outer surface with a plurality of projections or dimples 42, which dimples act to stabilize the pleats and prevent pleat crowding. The flow of lubricating oil is normally into the central chamber 30 through passageway 35, from the central chamber 30 through the perforations 18 in the cylindrical wall 14 to the filter paper 40, and radially outward through the porous filter paper and the apertures 16 in the outer cylindrical wall 12. Localized pressure differentials both create and aggravate localized crowding of the filter paper folds, one such type crowding being illustrated in FIGURE 4 at 44 wherein a plurality of pleats or corrugations are pressed close together over only a portion of the filter, leaving wide gaps such as 46 between the uncrowded pleats and adjacent pleats. This filter paper crowding adversely affects the efficiency and overall capacity of the filter and, for this reason, is undesirable.

FIGURES 5 and 6 illustrate in more detail the dimpled nature of the filter paper 40. In the perspective view of FIGURE 6, the filter paper is pleated or corrugated as indicated at 48 and preferably prior to pleating while the paper is still flat, a plurality of dimples 42 are pressed out on one surface of the paper and the paper is then pleated or folded so that the dimples all project from what ultimately defines the outermost surface of the filter paper when placed between the cylindrical walls 12 and 14. In the embodiment of FIGURES 5 and 6, the dimples 42 are all formed in a regular pattern on the filter paper and the corrugation lines 48 are chosen symmetrically with respect to the dimple pattern so that adjacent dimples such as 50 and 52 in FIGURE 5 abut each other when the paper is positioned in the filter. The dimples maintain the folds or pleats in position with sufficient spacing 54 thus permitting the free and ready flow of filtering fluid through the filter paper so that the serious disadvantages of localized crowding are substantially reduced, if not completely eliminated. the increased filter paper area provided by the projections or dimples not only acts to prevent crowding and facilitate lubricant flow but increases the potential contaminant load area of the filter paper.

FIGURES 7 and 8 show a modified embodiment wherein the filter paper 60 is provided with a pattern of randomly scattered dimples 62 on the outer surface. In this embodiment, the dimples on adjacent folds or pleats are not in alignment but still abut the flat surfaces of the adjacent pleats so as to maintain the pleats properly spaced against crowding. The randomly scattered dimples define spaces such as 64 which adequately provide for the free flow of lubricating fluid through the filter paper. The embodiment of FIGURES 7 and 8 has the advantage that dimple alignment need not be maintained during the folding or corrugating step of forming the paper.

The dimpled area of the filter paper preferably constitutes less than one-third the overall surface area of the filter paper in both embodiments. In each case, the filter paper is corrugated and dimpled on the outside surface so that adjacent folds are properly spaced against crowding by the projections or dimples. The dimple size may vary from $\frac{1}{16}$ inch to $\frac{1}{8}$ inch deep and may be $\frac{1}{4}$ to $\frac{3}{8}$ inch in diameter. The filter paper 40 or 60 may be of the conventional type or may be of special grade filter paper saturated with a suitable phenolic resin. Also usable in conjunction with the present invention are the multiphase type filter papers employing partial saturation.

It is apparent that in the embodiment of FIGURES 7 and 8, the dimples need not necessarily be limited to one side of the paper but dimples may be formed only on the outer surface, only on the inner surface or on both surfaces as desired. It is essential, however, that the dimples be of sufficient size to provide adequate spacing for the adjacent corrugations or folds and that they be sufficiently spaced so as to provide adequate flow areas for the fluid through the filter paper. An important feature of the present invention resulting from the dimpling disclosed is the fact that the dimples, while providing adequate spacing, do not reduce the active area of the filter paper but, in fact, actually increase the filter paper load area since only the extreme outer tips of each dimple are in direct contact with adjacent corrugations and the curved configuration of the dimples constitutes an increased surface area over the initial flat area of the paper.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters patent is:

1. An oil filter for use in filtering the lubricating oil of engines, comprising: inner and outer concentric cylinders; said inner cylinder being made of cold rolled steel and having a plurality of circular apertures through which the oil to be filtered passes; said outer cylinder being made of rigid synthetic plastic and having a plurality of dot-dash apertures through which the filtered oil passes; first and second annular end caps respectively secured to the ends of said cylinders and being made of tin plate so as to be impervious to the flow of oil; said end caps closing off the annular space between the ends of said cylinders so as to prevent the filtering oil from flowing through said space between the ends of said cylinders; said first end cap having a central depression which extends into and closes off one end of said inner cylinder so as to prevent said oil to be filtered from flowing through said one end of said inner cylinder; said second end cap having an upturned flange extending into the other end of said inner cylinder so as to form an aperture through which said oil to be filtered passes into said inner cylinder; an annular retainer shell being made of tin plate so as to be impervious to said oil to be filtered and having an inwardly turned flange secured to a portion of the outer surface of said second end cap; an annular retainer ring secured to the inner surface of said retainer shell and being separated from said inwardly turned flange by a gasket; a pressure plate tightly fitted within said inner cylinder and engaging the inner surface of said central depression of said first end cap; a helical reinforcing spring positioned within and along the length of said inner cylinder and having one end engaging said pressure plate and the other end circumscribing said upturned flange and engaging the inner surface of second end cap; a fluid pervious paper filter element positioned within the annular space between said cylinders and said end caps; said filter element having a plurality of pleats extending parallel with the longitudinal axis of said cylinders; each of said pleats having at least three rows of at least three hemispherical dimples embossed on its radially outer surface; said dimples being positioned on their respective pleat so that when adjacent pleats radially move toward each other the dimples on one of said adjacent pleats engage a respective dimple on the other of said adjacent pleats so as to stabilize the pleats and prevent pleat crowding so that the oil being filtered can flow freely through said filter element.

2. An oil filter in accordance with claim 1 wherein said dimples constitute less than one-third the overall surface area of said filter element.

3. An oil filter in accordance with claim 1 wherein said paper filter element is impregnated with a phenolic resin.

References Cited by the Examiner

UNITED STATES PATENTS

| 2,372,865 | 4/45 | Taylor | 210—493 |
| 2,468,862 | 5/49 | Briggs | 210—493 |
| 2,642,187 | 6/53 | Bell | 210—493 |
| 2,836,302 | 5/58 | Buckman | 210—493 |
| 2,933,192 | 4/60 | Gretzinger | 210—493 |
| 2,945,559 | 7/60 | Buckman | 210—493 X |
| 2,968,361 | 1/61 | Buckman | 210—493 X |
| 3,054,507 | 9/62 | Humbert | 210—493 |

FOREIGN PATENTS

| 1,111,568 | 11/55 | France. |
| 727,398 | 3/55 | Great Britain. |

REUBEN FRIEDMAN, *Primary Examiner.*

HARRY B. THORNTON, HERBERT L. MARTIN,
*Examiners.*